(12) United States Patent
French et al.

(10) Patent No.: US 9,066,620 B2
(45) Date of Patent: Jun. 30, 2015

(54) BARBEQUE RADIANT BURNER

(75) Inventors: John T. French, Anaheim, CA (US); Robert T. Evangelista, West Covina, CA (US)

(73) Assignee: Lynx Grills, Inc., Downey, CA (US)

( * ) Notice: Subject to any disclaimer, the term of this patent is extended or adjusted under 35 U.S.C. 154(b) by 733 days.

(21) Appl. No.: 13/348,588

(22) Filed: Jan. 11, 2012

(65) Prior Publication Data

US 2012/0178034 A1 Jul. 12, 2012

Related U.S. Application Data

(60) Provisional application No. 61/529,873, filed on Aug. 31, 2011, provisional application No. 61/432,157, filed on Jan. 12, 2011.

(51) Int. Cl.
| | |
|---|---|
| F23D 14/12 | (2006.01) |
| A47J 37/07 | (2006.01) |
| F23D 14/02 | (2006.01) |
| F23D 14/16 | (2006.01) |

(52) U.S. Cl.
CPC .............. *A47J 37/0713* (2013.01); *F23D 14/02* (2013.01); *F23D 14/12* (2013.01); *F23D 14/16* (2013.01)

(58) Field of Classification Search
CPC .............. F23D 14/14; F23D 2203/102; F23D 2900/14125; F23D 14/02; F23D 14/12; F23D 14/16; F23D 14/70; F23D 14/045
USPC .................................. 431/326, 328; 126/39 J
See application file for complete search history.

(56) References Cited

U.S. PATENT DOCUMENTS

| | | | | |
|---|---|---|---|---|
| 1,416,500 A | * | 5/1922 | Nicolaus .................... | 239/556 |
| 1,614,746 A | * | 1/1927 | Lyon ......................... | 431/347 |
| 1,955,622 A | * | 4/1934 | Dayton ...................... | 239/557 |
| 2,300,156 A | * | 10/1942 | Higley ........................ | 431/44 |
| 2,525,350 A | * | 10/1950 | Hanson ...................... | 239/552 |
| 2,607,405 A | * | 8/1952 | Weinandy ................... | 239/552 |
| 2,771,131 A | * | 11/1956 | Hook et al. ................. | 122/264 |
| 2,965,165 A | * | 12/1960 | Arnott et al. ............... | 239/432 |
| 3,200,874 A | * | 8/1965 | Koppel ....................... | 431/329 |
| 3,241,542 A | * | 3/1966 | Lotter ........................ | 126/39 J |
| 3,258,058 A | * | 6/1966 | Herault et al. ............. | 431/329 |
| 3,463,139 A | * | 8/1969 | Hayashi et al. ............ | 126/39 J |
| 3,552,378 A | * | 1/1971 | Zavadsky et al. .......... | 126/92 R |
| 3,578,891 A | * | 5/1971 | Cavestany et al. ......... | 431/191 |
| 3,661,499 A | * | 5/1972 | Krieger ...................... | 431/328 |
| 3,694,133 A | * | 9/1972 | Wilkerson .................. | 431/191 |
| 3,733,027 A | * | 5/1973 | Napier ....................... | 236/20 R |
| 3,847,536 A | * | 11/1974 | Lepage ....................... | 431/329 |
| 3,991,941 A | * | 11/1976 | Dornbach, Jr. ............. | 239/552 |
| 4,547,148 A | * | 10/1985 | Holmer ...................... | 431/328 |
| 4,607,609 A | * | 8/1986 | Keating ...................... | 126/39 J |
| 4,639,213 A | * | 1/1987 | Simpson .................... | 431/326 |
| 4,723,907 A | * | 2/1988 | Norton et al. .............. | 431/354 |
| 4,838,240 A | * | 6/1989 | Rieger ........................ | 126/92 R |
| 4,927,355 A | * | 5/1990 | Haire et al. ................. | 431/329 |
| 4,944,283 A | * | 7/1990 | Tsuchiya et al. ........... | 126/41 R |
| 5,391,076 A | * | 2/1995 | Home ......................... | 431/354 |

(Continued)

*Primary Examiner* — Jorge Pereiro
(74) *Attorney, Agent, or Firm* — McDermott Will & Emery LLP

(57) ABSTRACT

A radiant burner is disclosed that includes a body configured to form a tray having an open top and a perforated ceramic plate configured to fill the open top of the body and coupled to the body to form an enclosed volume. The radiant burner is configured such that the ceramic plate covers at least 90% of a projected top area of the radiant burner.

20 Claims, 4 Drawing Sheets

(56) References Cited

U.S. PATENT DOCUMENTS

| | | | | |
|---|---|---|---|---|
| 5,439,372 A * | 8/1995 | Duret et al. | | 431/7 |
| 5,447,437 A * | 9/1995 | Joynt et al. | | 434/226 |
| 5,511,974 A * | 4/1996 | Gordon et al. | | 431/329 |
| 5,816,235 A * | 10/1998 | Kim et al. | | 126/39 H |
| 5,989,013 A * | 11/1999 | Gray | | 431/326 |
| 6,672,302 B1 * | 1/2004 | Voorhis et al. | | 126/39 R |
| 6,705,307 B2 * | 3/2004 | Alden et al. | | 126/41 R |
| 7,267,544 B2 * | 9/2007 | Spangrud | | 431/354 |
| 7,611,351 B2 * | 11/2009 | Krauklis et al. | | 431/328 |
| 2003/0213484 A1 * | 11/2003 | Alden et al. | | 126/41 R |
| 2004/0018465 A1 * | 1/2004 | Voorhis et al. | | 431/328 |
| 2005/0284461 A1 * | 12/2005 | Hsu | | 126/41 R |
| 2006/0204916 A1 * | 9/2006 | Casillas | | 431/326 |
| 2006/0292510 A1 * | 12/2006 | Krauklis et al. | | 431/326 |
| 2008/0227044 A1 * | 9/2008 | Cookson et al. | | 431/328 |

* cited by examiner gas/air mixture (section a-a from FIG. 1)
(PRIOR ART)

(enlarged region 3 from FIG. 1)
(PRIOR ART)

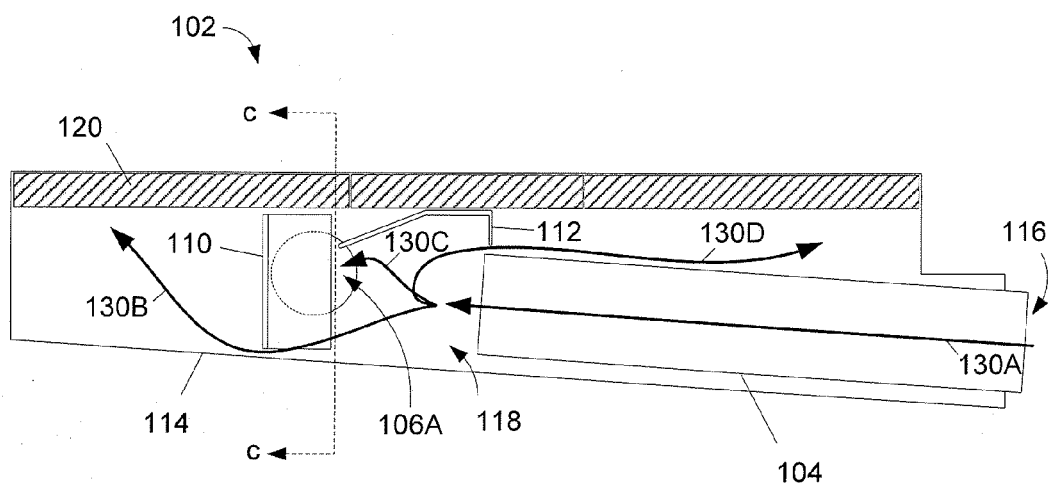
FIG. 6
(section b-b from FIG. 5)
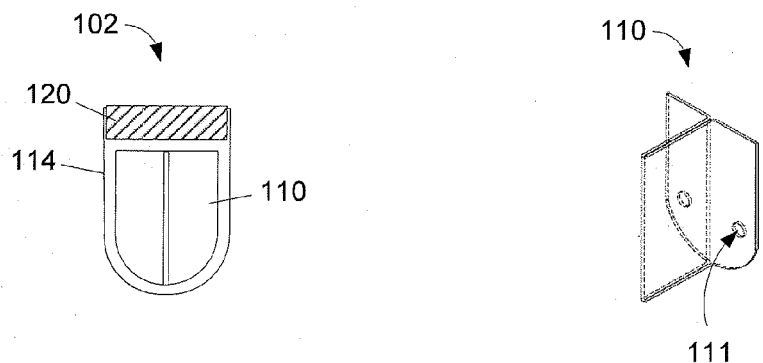
FIG. 7
(section c-c from FIG. 6)
FIG. 8

(section d-d from FIG. 9A)

BARBEQUE RADIANT BURNER

CROSS-REFERENCE TO RELATED APPLICATIONS

This application claims priority to U.S. Provisional Application No. 61/529,873, filed on Aug. 31, 2011 and to U.S. Provisional Application No. 61/432,157 filed on Jan. 12, 2011, which are incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION BY REFERENCE OF MATERIAL SUBMITTED ON A COMPACT DISC

Not Applicable.

BACKGROUND OF THE INVENTION

1. Field of the Invention

The present invention generally relates to radiant burners and, particularly, to radiant burners used to grill food in a barbeque.

2. Background Art

Ceramic plates are often used to create radiant burners. The plates may be between 0.25 and 1.0 inches thick with a plurality of small-diameter holes passing through the thickness of the plate. A mixture of a flammable gas, such as propane or natural gas, and air is provided on the underside of the plate. As the mixture passes through the plate, the gas and air burn and release heat which is transferred into the ceramic plate. The plates become red hot and therefore radiate infrared heat. A portion of the radiated heat is directed towards food that is placed on grills positioned above the ceramic plates, thereby cooking the food. This type of cooking is particularly suited to cooking meat, wherein it is desirable to sear the surface of the meat.

One of the drawbacks of the current method of providing radiant heat is that the radiant burners become clogged with grease that drips off of steaks and other meats as they are cooked. Previous radiant burners are constructed as boxes with the top surface provided with the ceramic plates with certain regions blocked to gas flow.

FIG. 1 depicts such a radiant burner 10 where hatched region 12 indicates the area where ceramic plate 12A is exposed while the region 14 is blocked, i.e. such as solid sheet metal or ceramic cement. Only a portion of the total surface of 10 is configured to expose the ceramic plate 12A so as to provide the appropriate amount of radiant heat for cooking food. A gas/air mixture is provided at inlet 16.

A cross-section taken on line a-a of FIG. 1 of this existing design of radiant grill is shown in FIG. 2. The gas/air mixture that entered through inlet 16 fills the cavity 18. It can be seen how the perforated ceramic plate 12A covers the entire top of the cavity 18. Certain regions 14 of the surface of the ceramic plate 12A are blocked such that the gas/air mixture can pass only through the open regions 12. The arrows indicate the flow of the gas/air mixture from the cavity 18 through the ceramic plate 12A.

FIG. 3 is an enlarged area 3 from FIG. 1 that illustrates one of the drawbacks of current designs. A spot of grease 19 has dripped onto the region 14 adjacent to the surface 12 of a ceramic plate 12A and has not burned off as there is no heat in area 14. Grease 19 that falls onto the surface 12 of a red-hot ceramic plate 12A tends to immediately burn off. Grease 19 that falls onto the blocked region 14 may continue to build up on the edge of the blocked region 14 over time as this grease 19 does not burn off. The built-up grease 19 will tend to flow into area 12 and block the holes (not visible in FIG. 3) of the ceramic plates 12A, eliminating the heat in that portion of area 12. Over time, the grease-covered area expands as indicated by the rings T1-T5 as the holes on the edge of the grease-blocked area are incrementally blocked. It is difficult to clean the ceramic blocks 12A as scrubbing may damage the ceramic plates 12A and will not remove grease that has flowed down into the holes.

BRIEF SUMMARY OF THE INVENTION

There is a need for a radiant burner that is less prone to grease build-up. The present disclosure describes a radiant burner that has a reduced area of non-radiant surface adjacent to the radiant burners that reduces the likelihood of clogging, thereby improving the performance of the radiant burner and extending its operational life.

In certain embodiments, a radiant burner is disclosed that includes a body configured to form a tray having an open top and a perforated ceramic plate configured to fill the open top of the body and coupled to the body to form an enclosed volume. The radiant burner is configured such that the ceramic plate covers at least 90% of a projected top area of the body.

In certain embodiments, a radiant burner assembly is disclosed that includes a first radiant burner that has a body configured to form a tray having an open top and a perforated ceramic plate configured to fill the open top of the body and coupled to the body to form an enclosed volume. The radiant burner is configured such that the ceramic plate covers at least 90% of a projected top area of the radiant burner.

The foregoing has outlined rather broadly the features of the present disclosure in order that the detailed description that follows can be better understood. Additional features and advantages of the disclosure will be described hereinafter. These and other advantages and features will become more apparent from the following description taken in conjunction with the drawings.

BRIEF DESCRIPTION OF THE SEVERAL VIEWS OF THE DRAWINGS

For a more complete understanding of the present disclosure, and the advantages thereof, reference is now made to the following descriptions to be taken in conjunction with the accompanying drawings, which are incorporated herein by reference, describing specific embodiments of the disclosure, wherein:

FIG. 6 is a cross-sectional side view of the central burner of FIG. 5 according to certain aspects of this disclosure.

FIG. 7 is a cut-away front view of the central burner of FIG. 6 according to certain aspects of this disclosure.

FIG. 8 is a perspective view of an exemplary flow baffle according to certain aspects of this disclosure.

DETAILED DESCRIPTION OF THE INVENTION

The system of this disclosure is presented in an exemplary embodiment of a radiant burner assembly configured to be a component of an outdoor barbeque that includes a grill positioned over the radiant burner assembly so as to allow food such as steaks to be cooked by the heat of the radiant burner assembly. This embodiment is sufficient to present the concept and advantages of the disclosed system. It will be obvious to those of ordinary skill in the art that the principles and designs disclosed herein can be applied in other areas and for other purposes, such as an industrial heating process. Nothing in this disclosure shall be interpreted to limit the application of the systems disclosed herein to a barbeque or a particular use unless explicitly stated as such.

Figure 1:
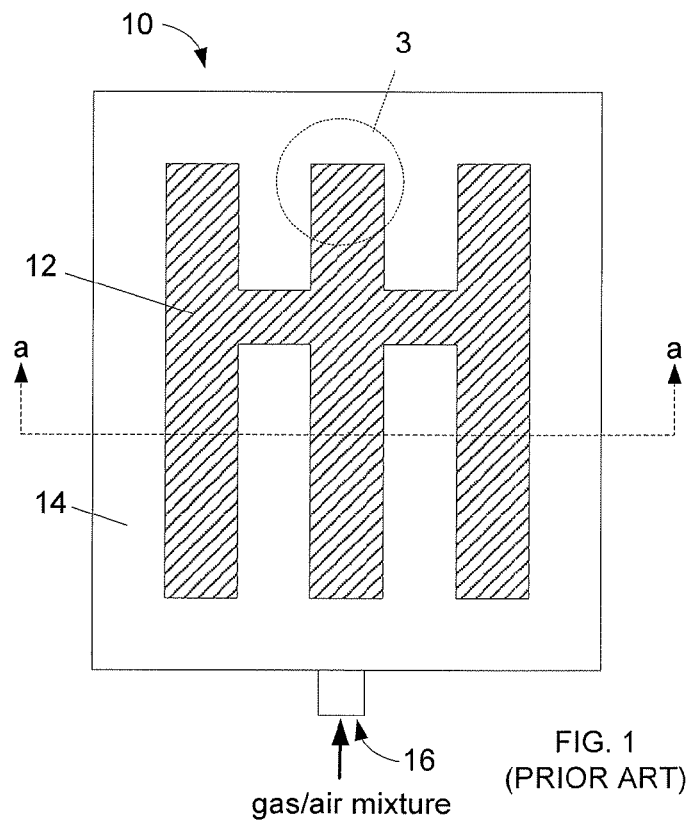
FIG. 1 is a perspective view of a prior art radiant burner.
Figure 2:
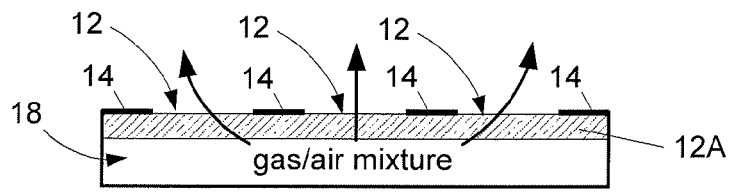
FIG. 2 is a cross-section of the prior art burner of FIG. 1.
Figure 3:
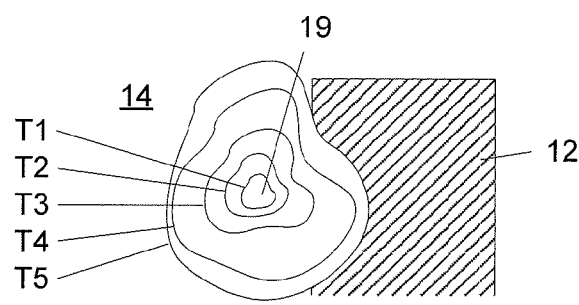
FIG. 3 is a close-up of a region indicated in FIG. 1 showing the clogging of a prior art burner over time.
Figure 4:
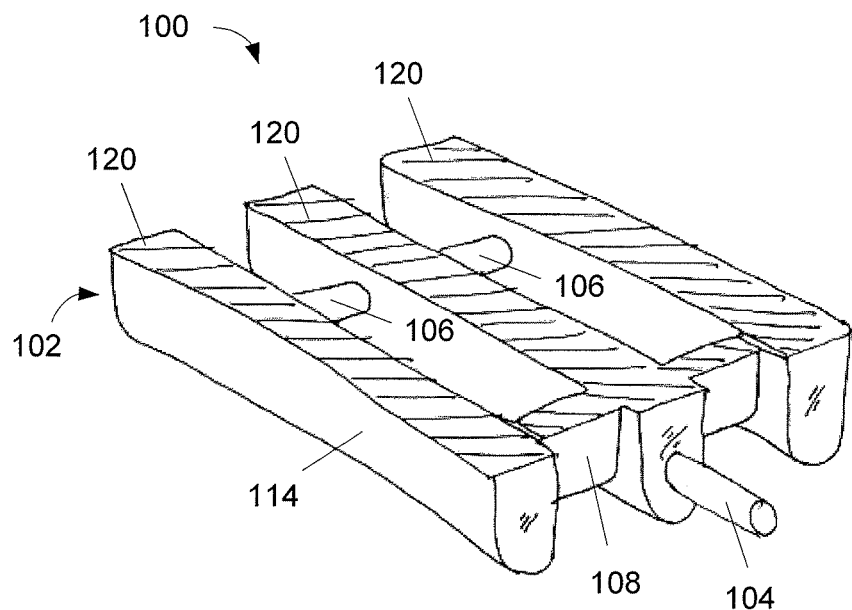
FIG. 4 is a perspective view of an exemplary embodiment of a radiant burner assembly according to certain aspects of this disclosure.

FIG. 4 is a perspective view of an exemplary embodiment of a radiant burner assembly 100 according to certain aspects of this disclosure. The assembly 100 comprises, in this embodiment, three parallel radiant burners 102 connected by flow tubes 106. Each of the radiant burners 102 comprises a body 114 formed, in this embodiment, from sheet metal and one or more ceramic plates 120 forming an upper surface. The body 114 and plates 120 are coupled together to form an enclosed volume 118. The body 114 forms an open-top tray and the ceramic plate 120 is positioned to cover the open top of the body 114. In certain embodiments, the body 114 includes a lip or slot (not shown) around the edge of the open top to retain the ceramic plate 120 in position to cover the open top and generally seal the joint between the body 114 and ceramic plate 120. In certain embodiments, a ceramic fiber paper (not shown) is placed between the ceramic plate 120 and the body 114 to improve the seal. In certain embodiments, the assembly 100 comprises a single burner 102. In certain embodiments, the assembly 100 comprises two burners 102. In certain embodiments, the assembly 100 comprises four or more burners 102. The assembly 100 depicted in FIG. 1 also includes two carry-over burners 108. A flammable gas, such as propane or natural gas, is mixed with air and provided to the assembly 100 through feed tube 104 that is coupled to the central burner 102. In certain embodiments, feed tube 104 comprises a venturi (not visible in FIG. 5) draws in air as the flammable gas flows into the feed tube 104, thereby providing the gas/air mixture to the enclosed volume 118.

The assembly 100 comprises an igniter (not shown) disposed in or in proximity to one of the burners 102. When the gas/air mixture is initially ignited, the flame is at least partially above the ceramic plates 120. The function of the carry-over burners 108 includes carrying the flame from the burner 102 that is ignited by the igniter to the other burners 102. In certain embodiments, the flame front descends into the holes of the ceramic plates 120 as the ceramic plates 120 heat up, thereby increasing the heat transfer into the plates 120.

The upper edges of the body 114 are configured with one or more tabs project above the edge and are folded over the ceramic plate 120 after the ceramic plate is placed in the slot or shelf of the body 114, thereby retaining the ceramic plate 120 in place. In certain embodiments, one or more separate hold-down straps (not shown) are placed over the ceramic plates 120 and coupled to the body to hold the ceramic plates 120 in place. In certain embodiments, a plan view of the burner assembly 100 has at least 90% of the top project area covered by the exposed surface 12 of the ceramic plates 120. In certain embodiments, a plan view of the burner assembly 100 has at least 95% of the top project area covered by the exposed surface 12 of the ceramic plates 120. In certain embodiments, a plan view of the burner assembly 100 has at least 98% of the top project area covered by the exposed surface 12 of the ceramic plates 120.

The radiant burners 102 of the radiant burner assembly 100 are configured as substantially the same in width and length of the radiant surface area, i.e. the area of the ceramic plates 120, wherein the length is greater than the width. The burners 102 are arranged in a row wherein the lengths are parallel to each other and the burners 102 are separated from each other in the direction of the widths of the burners 102 and the surfaces of the ceramic plates 120 are substantially co-planar. The separation distance between the burners 120 is chosen to provide substantially even heat over a cooking area that is a second plane that is above the plane of the ceramic plates 120 and generally centered over the surfaces of the ceramic plates 120. In certain embodiments, the separation of the cooking plane and the co-planar surfaces of the ceramic plates 120 is adjustable. When cooking certain foods, it is desirable that the radiated heat varies less than 25% of the maximum over the cooking area. In certain embodiments, the burners 102 are separated from each other by a distance that is between 50% and 200% of the width of the radiant burners 102. In certain embodiments, the burners 102 are separated from each other by a distance that is between 80% and 120% of the width of the radiant burners 102.

Figure 5:
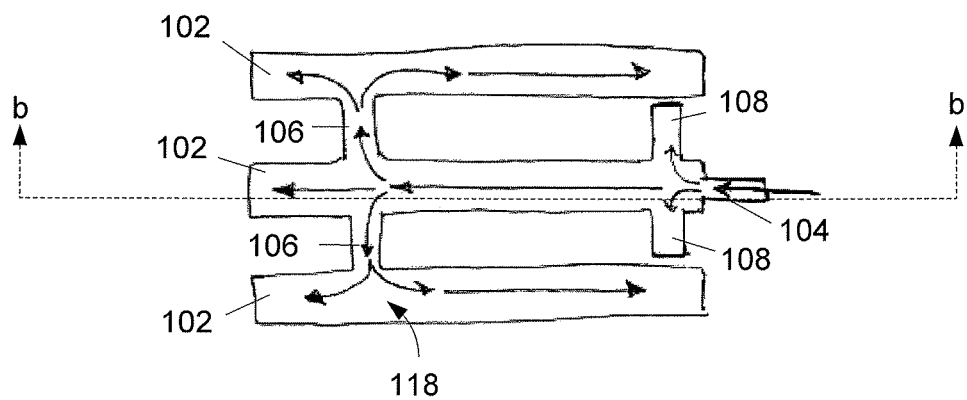
FIG. 5 is a plan view of the radiant burner assembly of FIG. 4 according to certain aspects of this disclosure.

FIG. 5 is a plan view of the radiant burner assembly 100 of FIG. 4 according to certain aspects of this disclosure. The arrows indicate the direction of flow of the gas/air mixture as it enters feed tube 104 and spreads through the enclosed volume 118. A portion of the gas/air mixture flows into the two carry-over burners 108, which are dead-ended in this embodiment. In certain embodiments, the carry-over burners 108 provide a flow path between the enclosed volumes of adjacent burners 102. The remaining gas/air mixture flows along the central burner 102. Portions of the gas/air mixture flow through the flow tubes 106 to the outer burners 102. In certain embodiments, the flow resistance of the ceramic plates is such that the pressure within the enclosed volume 118 of the burner 100 is generally uniform such that the flow rate of the gas/air mixture through the holes of the plates 120 is generally uniform. In certain embodiments, the pressure within the enclosed volume 118 of the assembly 100 varies by less than 10%. In certain embodiments, the size and spacing of the holes in the ceramic plates are uniform. In certain embodiments, the size of the holes varies over the surface of ceramic plates 120. In certain embodiments, the spacing of the holes varies over the surface of ceramic plates 120.

FIG. 6 is a cross-sectional side view of the central burner 102 of FIG. 5 according to certain aspects of this disclosure. The view is taken as shown by the dashed line b-b in FIG. 5. It can be seen that the bottom surface of the body 114 slopes downward towards the inlet 116 of feed tube 104. The body 114 also includes holes 106A that are positioned at the junction of cross-flow tubes 106, thus providing a flow path from the enclosed space 118 of the burner 102 into the cross-flow tubes 106. In this embodiment, three ceramic plates 120 cover the top surface of burner 102. A baffle 110 and a diverter 112 are disposed within the enclosed volume 118 adjacent to the hole 106A. The construction details of the baffle 110 are discussed in greater detail with respect to FIGS. 7 and 8. The diverter, in this embodiment, is a planar element folded as seen in the profile view of the diverter 112 in FIG. 6 and positioned adjacent to the underside of a ceramic plate 120.

The gas/air mixture is introduced through inlet 116 and flows as indicated by the arrow 130A through the feed tube 104. It can be seen that the gas/air mixture thus enters the enclosed volume 118 near the middle of the burner 102 rather than at the end nearest the inlet 116. Portions of the gas/air mixture then flow as indicated by the three arrows 130B, 130C, and 130D, wherein the portion 130B flows around the baffle 110 and into the space under the ceramic plates 120 at the end furthest from the inlet 116. Portion 130C flows through the hole 106A (as well as through the matching hole on the nearside of body 114 that has been removed) and into the adjacent burner 102. The third portion 130D reverses direction and flows back toward the inlet 116 within the enclosed volume 118 of the central burner 102. Thus, the gas/air mixture flows to all portions of the radiant burner assembly 100.

The baffle 110 serves to disrupt the directional flow of the gas/air mixture that is exiting the feed tube 104, thereby raising the static pressure in that portion of the enclosed volume 118. As this disruption takes place near the center of the enclosed volume of the central burner 102 and adjacent to the openings 106A to the other burners 102, the flow of the gas/air mixture to the three burners 102 tends to be uniform. In certain embodiments, the flow restriction of the holes through the ceramic plates 120 is sufficient that the static pressure throughout the enclosed volume 118 of all burners 102 tends to be relatively constant. In certain embodiments, the pressure throughout the enclosed volumes 118 of all radiant burners 102 varies less than ten percent.

FIG. 7 is a cut-away front view of the central burner 102 of FIG. 6 according to certain aspects of this disclosure. The view is taken as shown by the dashed line c-c in FIG. 6, although the view is of the entire burner assembly 100. It can be seen that the baffle 110 has a profile that is similar to the internal shape of body 114 and reduced in size such that there is a gap between the edge of the baffle 110 and the wall of body 114. This gap provides the opening such that the gas/air mixture can follow the path of arrow 130B past the baffle 110 as shown in FIG. 6. The openings may also be provided by perforations in the baffle 110 as shown in FIG. 8.

FIG. 8 is a perspective view of an exemplary flow baffle 110 according to certain aspects of this disclosure. In this embodiment, the baffle 110 is folded from a single shaped piece of sheet metal. In certain embodiments, one or more perforations 111 are provided in the baffle 110 so as to allow a determined amount of gas/air mixture to pass through the baffle 110. In certain embodiments, the baffle 10 is an extruded piece of metal. In certain embodiments, the baffle 10 is constructed from several components.

Figure 9A:
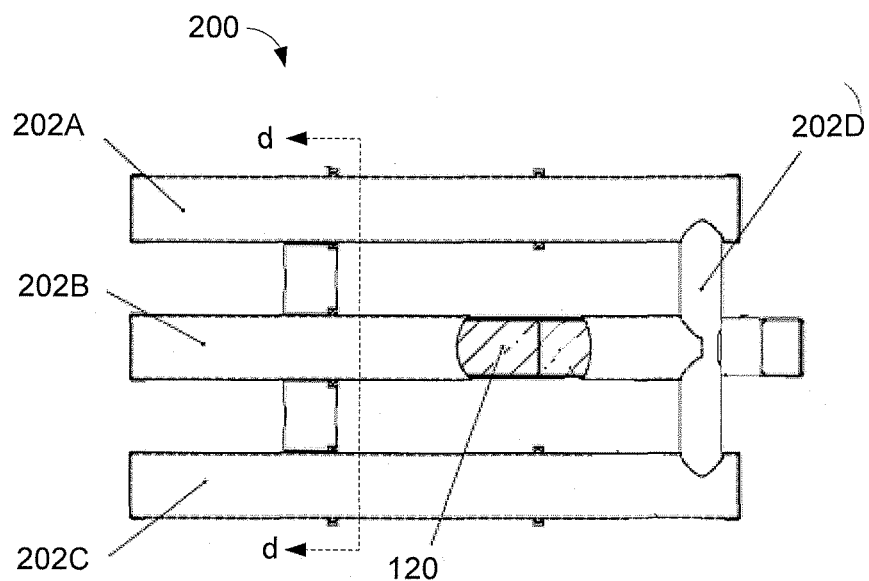
FIG. 9A is a plan view of another embodiment of a radiant burner assembly according to certain aspects of this disclosure.

FIG. 9A is a plan view of another embodiment 200 of a radiant burner assembly according to certain aspects of this disclosure. In certain embodiments, a mesh 202 is placed over the ceramic plates 120. In certain embodiments, the mesh 202 tends to prevent larger food items from falling directly onto the ceramic plates 120. In certain embodiments, the mesh 202 is formed as semicircular arches 202A, 202B, 202C, and 202D over the ceramic plates 120 (as seen in the cutaway of the screen 202B) of burners 102 and 108. In certain embodiments, the mesh 202 is formed into flat regions (not shown) forming a triangular profile in at least one direction.

Figure 9B:
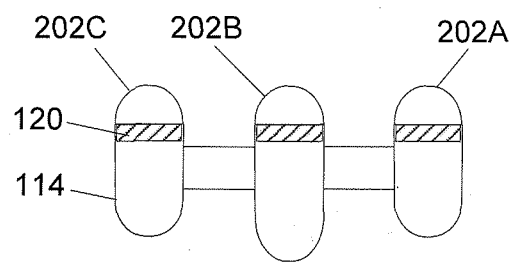
FIG. 9B is a cross-sectional front view of the radiant burner assembly of FIG. 9A according to certain aspects of this disclosure.

FIG. 9B is a cross-sectional front view of the radiant burner assembly 200 of FIG. 9A according to certain aspects of this disclosure. The view is taken as shown by the dashed line d-d in FIG. 9A. The semi-circular profile of the meshes 202A, 202B, and 202C over the burners 102 and the position of the mesh over the ceramic plates 120 are visible in the view of FIG. 9B.

The disclosed burner is configured such that grease and dripping from food being cooked will fall onto a hot radiant burner or fall between the burners. As grease and dripping that fall onto radiant surfaces are incinerated immediately, the disclosed radiant burner will continue to provide radiant heat over the entire cooking area for an increased length of time compared to prior art burners.

The previous description is provided to enable any person skilled in the art to practice the various aspects described herein. Although embodiments of the present disclosure have been described and illustrated in detail, it is to be clearly understood that the same is by way of illustration and example only and is not to be taken by way of limitation. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims.

Reference to an element in the singular is not intended to mean "one and only one" unless specifically so stated, but rather "one or more." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

What is claimed is:

1. A burner assembly comprising:
   a first burner comprising:
      a first body having first and second ends, and configured to form a tray having an open top; and
      a first perforated ceramic plate configured to fill the open top of the first body and coupled to the first body;
   a second burner comprising:
      a second body configured to form a tray having an open top; and
      a second perforated ceramic plate configured to fill the open top of the second body and coupled to the second body;
   a cross-flow tube connecting the first body and the second body such that a flow path is provided between the trays of the first and second burners, the cross-flow tube spaced from the first and second ends of the first body; and
   a baffle positioned in the first body in proximity to the cross-flow tube.

2. The radiant burner assembly of claim 1, further comprising a feed tube extending into the first body, wherein the baffle is positioned between the cross-flow tube and the first end of the first body, and wherein an outlet end of the feed tube is positioned between the cross-flow tube and the second end of the first body.

3. The radiant burner assembly of claim 1, further comprising a dead-ended carry-over burner comprising:
a third body configured to form a tray having an open top; and
a third perforated ceramic plate configured to fill the open top of the third body and coupled to the third body.

4. A barbeque comprising:
a first burner comprising:
a first body having first and second ends, and configured to form a tray having an open top; and
a first perforated ceramic plate configured to fill the open top of the first body and coupled to the first body to form an enclosed volume;
a second burner comprising:
a second body configured to form a tray having an open top; and
a second perforated ceramic plate configured to fill the open top of the second body and coupled to the second body to form an enclosed volume;
a cross-flow tube coupled between the first body and the second body such that a flow path is formed between the enclosed volumes of the first and second burners, the cross-flow tube spaced from the first and second ends of the first body; and
a baffle positioned in the first body in proximity to the cross-flow tube;
wherein the first burner is configured such that the ceramic plate covers at least 90% of a projected top area of the first body.

5. The barbeque of claim 4, further comprising:
a screen coupled to the first body and disposed over the first perforated ceramic plate, the screen comprising metal wires.

6. The barbeque of claim 5, wherein the screen is shaped with a profile in one direction of an approximate semicircle.

7. The barbeque of claim 4, wherein:
the first perforated ceramic plate has a length, a width, and a thickness;
the first perforated ceramic plate is coupled to the first body along at least one of the length and the width; and
the first perforated ceramic plate comprises a plurality of holes passing through the thickness of the plate.

8. The barbeque of claim 4, further comprising a feed tube extending into the first body, wherein the baffle is positioned between the cross-flow tube and the first end of the first body, and wherein an outlet end of the feed tube is positioned between the cross-flow tube and the second end of the first body.

9. The barbeque of claim 4, further comprising a carry-over burner comprising:
a third body configured to form a tray having an open top; and
a third ceramic plate configured to fill the open top of the third body and coupled to the third body to form an enclosed volume;
wherein the enclosed volume of the carry-over burner is in flow communication with only one of the first burner or the second burner.

10. A radiant burner assembly comprising:
a first radiant burner having first and second ends, and comprising:
a first body configured to form a tray having an open top; and
a first perforated ceramic plate configured to fill the open top of the first body and coupled to the first body to form an enclosed volume;
a second radiant burner comprising:
a second body configured to form a tray having an open top; and
a second perforated ceramic plate configured to fill the open top of the second body and coupled to the second body to form an enclosed volume;
a cross-flow tube coupled between the first radiant burner and the second radiant burner, the cross-flow tube forming a flow path between the enclosed volumes of the first and second radiant burners such that a gas/air mixture provided into the first radiant burner flows into the second radiant burner, the cross-flow tube spaced from the first and second ends of the first radiant burner; and
a baffle positioned in the first burner in proximity to the cross-flow tube;
wherein the first radiant burner is configured such that the ceramic plate covers at least 90% of a projected top area of the first radiant burner.

11. The radiant burner assembly of claim 10, wherein:
the first radiant burner comprises a feed tube; and
the feed tube is configured to accept a flow of flammable gas from an external source, draw in air when the accepted flammable gas is flowing, mix the air with the gas, and provide the gas/air mixture into the enclosed volume of the first radiant burner.

12. The radiant burner assembly of claim 10, further comprising:
a first screen coupled to the first body and disposed over the first perforated ceramic plate of the first radiant burner, the screen comprising metal wires.

13. The radiant burner assembly of claim 12, wherein the first screen is shaped with a profile in one direction of an approximate semicircle.

14. The radiant burner assembly of claim 10, wherein:
the first perforated ceramic plate of the first radiant burner has a length, a width, and a thickness;
the first perforated ceramic plate is coupled to the first body along at least one of the length and the width; and
the first perforated ceramic plate comprises a plurality of holes passing through the thickness of the plate.

15. The radiant burner assembly of claim 10, further comprising:
a second screen coupled to the second body and disposed over the second perforated ceramic plate, the second screen comprising metal wires.

16. The radiant burner assembly of claim 15, wherein the second screen is shaped with a profile in one direction of an approximate semicircle.

17. The radiant burner assembly of claim 10, wherein:
the second perforated ceramic plate of the second radiant burner has a length, a width, and a thickness;
the second perforated ceramic plate is coupled to the second body along at least one of the length and the width; and
the second perforated ceramic plate comprises a plurality of holes passing through the thickness of the plate.

18. The radiant burner assembly of claim 10, further comprising:
a carry-over burner comprising:
a third body configured to form a tray having an open top; and
a third perforated ceramic plate configured to fill the open top of the third body and coupled to the third body to form an enclosed volume;

wherein the carry-over burner is configured such that an exposed portion of the third perforated ceramic plate covers at least 90% of a projected top area of the carry-over burner, wherein the carry-over burner is coupled to at least one of the first radiant burner or the second radiant burner such that the gas/air mixture can flow from the enclosed volume of the at least one of the first radiant burner or the second radiant burner into the enclosed volume of the carry-over burner, and wherein a top surface of the ceramic plate of the carry-over burner is disposed adjacent to and coplanar with a top surface of the first and second perforated ceramic plates.

19. The radiant burner assembly of claim 18, wherein the carry-over burner is dead-ended.

20. The radiant burner assembly of claim 10, wherein:

the first radiant burner has a first width, and a first length that is at least 300% of the width, the first end spans the first width at one end of the first length, and the second end is at the other end of the first length from the first end;

the second radiant burner has a second width that is substantially the same as the first width of the first radiant burner, a second length, and a first end spanning the second width at one end of the second length;

the first and second radiant burners are arranged in a row in the direction of the widths with the first ends of the first and second radiant burners aligned; and each of the radiant burners is separated by a distance that is between 50% and 200% of the first width.

* * * * *